Nov. 5, 1940.  C. SCHULZ  2,220,547
VEHICLE BODY
Filed July 6, 1937  2 Sheets-Sheet 1
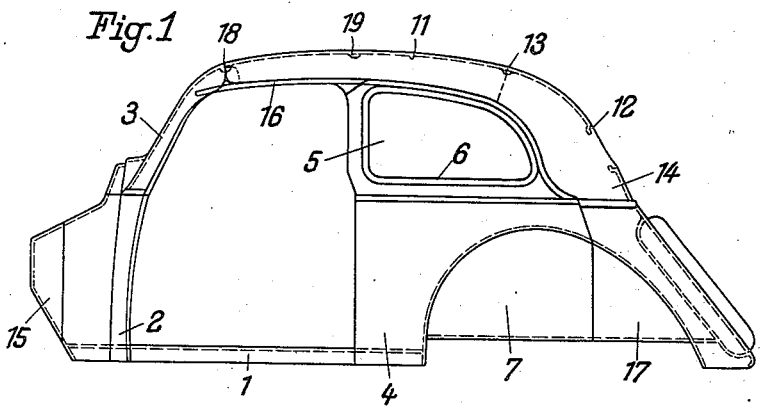
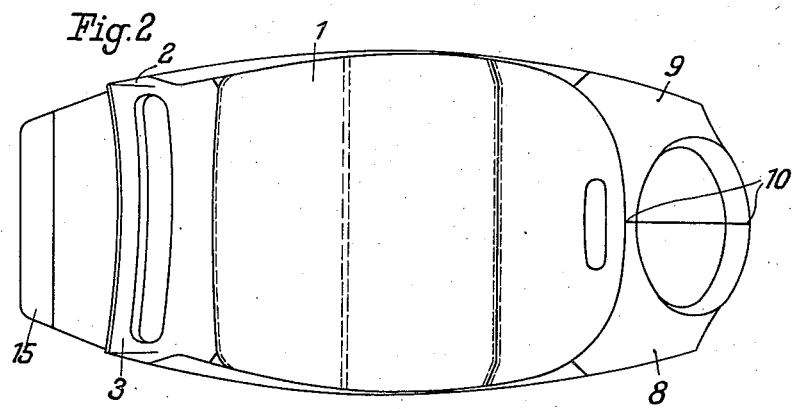
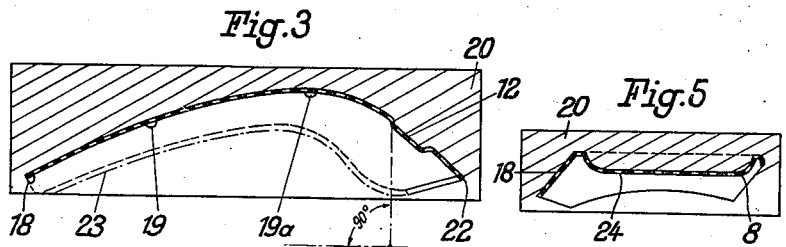
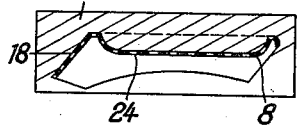
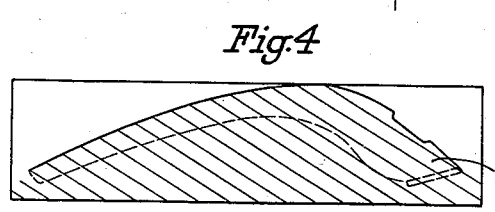
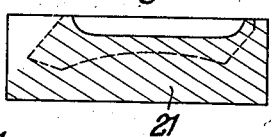
Inventor:
Conrad Schulz
By: Glascock Downing & Seebold
Attys.

Nov. 5, 1940.  C. SCHULZ  2,220,547
VEHICLE BODY
Filed July 6, 1937   2 Sheets-Sheet 2
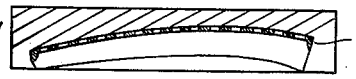
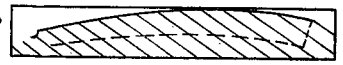
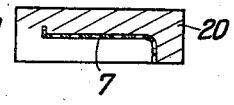
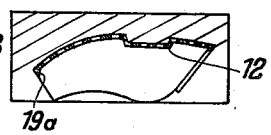
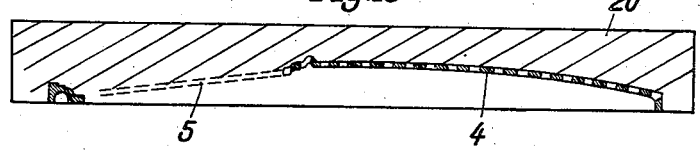
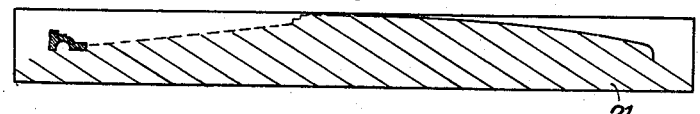
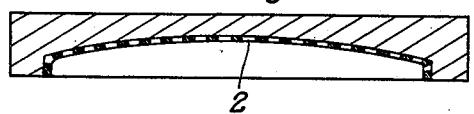
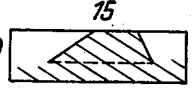
Inventor:
Conrad Schulz
By: Glascock Downing & Seebold
Attys.

Patented Nov. 5, 1940

2,220,547

UNITED STATES PATENT OFFICE 2,220,547

VEHICLE BODY

Conrad Schulz, Berlin-Spandau, Germany, assignor to Auto Union Aktiengesellschaft, Chemnitz, Germany Application July 6, 1937, Serial No. 152,247
In Germany July 9, 1936

1 Claim. (Cl. 296—31)

In ordinary all-steel vehicle constructions the division into the individual pressed parts is chosen on the ground of considerations which are of importance in the drawing of the sheet metal. One such consideration, for example, is to arrange the division in such a manner that deep drawing processes are avoided in order to avoid high stressing of the steel sheet during the pressing operation.

The invention provides a vehicle body, more particularly for automobiles, using pressed parts of artificial resin materials containing fillers, and the novelty consists in this, that the vehicle body is divided up into individual parts which can be assembled and which consist of laminated artificial material, preferably of superposed paper webs impregnated with artificial resin in such a manner that the surfaces of the flanges, reinforcements or edges projecting from the wall of the pressed parts extend in such a manner that the pressed part can be drawn away from the plunger and from the die in at least one direction.

This consideration is unimportant in the manufacture of the vehicle body from sheet steel; the individual sheet steel parts, after being removed from the die, require considerable subsequent working before the parts can be welded together. In artificial resin pressed masses, on the other hand, the arrangement of the division in accordance with the profiles to be pressed in is important because in this way subsequent working of the parts is avoided, that is for example, all the window edges and door frames are pressed initially in their final shape.

A further important consideration for the division of the vehicle body consists according to the invention in this, that in order to utilize the full pressure, the division is also made such that in one pressed part large openings (for example side windows) are adjacent to uninterrupted surfaces or profiles which require considerable pressure. In practice the division according to this second consideration can be carried out in such a manner that for a given press the size of the part to be made on the press can be calculated. For example, with a material which requires a pressure of 400 kg./cm.$^2$ and with a press available with a maximum pressure of 4,000 tons, a continuous surface of about 1 m.$^2$ can be made. According to the invention the division is made such that the continuous surface is kept smaller and the excess pressure available is used for making an opening provided with an edge adjoining this surface. Such a part in an automobile, for example is the front part of the side wall adjoining the side window. A further part which requires high pressure is, for example, the windscreen with the adjoining margin and the arched part for attaching the roof and the recesses for attaching the end wall.

A further consideration for arranging the division is found according to the invention in the fact that the division is made such that the joints follow the natural course of the useful or ornamental ledges. In this way, for example, it is made possible for the rain channels running along the side walls to be pressed together with the side parts or with the roof and ornamental ledges at other points make it possible to cover the joints between the parts and give protection from the entry of moisture, especially in combination with water-rejecting strips inserted in the joints.

It is further desired to arrange the division in such a manner that only short joints occur at visible parts, which are then so arranged that they lie in the course of one of the useful or ornamental ledges. In order to obtain sufficient bearing surfaces it is proposed, according to the invention, that at particularly short portions of the parts the joints should be inclined with respect to one of the principal planes of the vehicle. On account of this inclination, the course of the useful or ornamental ledges is not interfered with, and further the necessary number of securing screws can be provided in such enlarged joints. Where a division is unavoidable on account of the size of the surface to be pressed, according to the invention the division is preferably made such that it extends along a reinforcing rib. This occurs, for example, in dividing up the roof where the joint is placed in the middle of a reinforcing rib extending transversely across the roof in the inside.

Further useful features of the invention will be more fully described below.

The invention is illustrated in a constructional example in the accompanying drawings.

Fig. 1 is a side elevation of the vehicle body,

Fig. 2 shows the vehicle body from above with the roof partly broken away,

Figs. 3 and 4 show a die and plunger with the roof part in section,

Figs. 5 and 6 show a die and plunger with the rear part in section,

Figs. 7 and 8 show a die and plunger with the upper cowl part in section,

Figs. 9 and 10 show a die and plunger with the wheel housing in section,

Figs. 11 to 14 show dies and plungers with the parts for a divided roof in section, Figs. 15 and 16 show dies and plungers with side parts in section, Figs. 17 and 18 show dies and plungers with cowl parts in section, and Figs. 19 and 20 show dies and plungers with the end wall in section.

According to Figs. 1 and 2 the vehicle body consists of a floor part 1, on which are placed the lower cowl side parts 2; adjoining these and above is the cowl 3 containing the windscreen opening. At the other end of the floor side parts 4 are attached which also contain the side window 5 with frame 6. According to the press available, the wheel housings 7 may be pressed along with these side parts 4 or they may be separate parts to be attached individually. At the rear the vehicle body is closed by the two rear parts 8 and 9, the joint 10 lying in the middle of the depression for the spare wheel. At the top the vehicle is closed by a roof 11, which has the frame 12 for the rear window pressed in with it. In case the necessary pressure, which depends upon the material used, is insufficient, provision is made at 13 for dividing the roof in such a manner that the part containing the rear window forms a separate pressed part 14.

At the front the body is closed by the end wall 15. The spaces remaining between the side part 4 and the cowl 3 at the upper door frame are filled by short parts 16. The portion 17 of the wheel housing 7 which is necessarily left over when the parts 7 and 4 are made integral, constitutes a separate pressing or if necessary may be replaced by sheet metal. All the parts are provided with pressed-on flanges 18 which are connected together when assembling the body by means of screw bolts or steel screws. Moreover, those parts which have large continuous surfaces are reinforced by means of specially applied ribs 19. The constructional material is preferably laminated pressed artificial resin material, the layers being formed of paper layers, if necessary in combination with layers of fabric. The pressure required with such material varies between 300–400 kg./cm.², while the notch shock strength of about 25 to 30 cmkg./cm.² is maintained by the pressing operation. The reinforcing ribs as usual are separately applied by placing strips of the same material on the constructional material before the pressing and welding them to the material. The window and door frames are preferably so formed that the layers of the main wall surfaces run out into these profiles so that the full strength is maintained even at the points of bending. These edges are pressed on together with the remaining parts and the course of the parts projecting from the main surface is made such that it coincides at least with the direction of drawing off of the plunger.

Figs. 3 and 4 show the pressed parts for the roof 11 inserted in a die 20 and removed from a plunger 21. The pressing in this case is already hardened. This is effected in the usual manner by cooling the mould. All the edges and flanges projecting from the main surface are pressed in simultaneously, that is, the front flange 18, the rear strip 22, the reinforcing rib 19 extending transversely across the inside of the roof, and if desired the rain channel 23, shown in broken lines, which according to its external shape can be pressed on the side parts 4 and the connecting pieces 16.

The frame 12 of the rear window is not, as is usual, provided at the inside with a surface extending at right angles to the remainder of the inner surface of the roof but the direction of this surface depends upon the withdrawal direction of the plunger. This direction is again determined by the size of the pressing and by its shape. The deciding factors for the size, for example of the roof 11, are all three considerations, namely the possibility of making the direction of the window edges coincide with the withdrawal direction of the plunger and of making the edge itself coincide with the useful or ornamental ledges (rain channels) and of adapting the total surface to the pressure available. Also all the other individual parts are dimensioned in accordance with these three considerations, and are brought into a given direction with respect to the withdrawal direction of the plunger.

In Figs. 5 and 6 a rear part 8 is shown. Here also flanges 18 for attachment to the adjoining parts are provided and the pressing has a depression 24 for the spare wheel.

The cowl 3 is illustrated in Figs. 7 and 8. Its dimensions are so chosen that the available pressure is adequate for the windscreen frame, which requires high pressure and for the connection part 25 without the cowl having to be made in more than one part. In deciding on the dimensions of this part the opening for the windscreen is taken into consideration, which requires no pressure; the pressure saved in this way is distributed over the frame and its flanges in such a manner that a construction in one piece is possible and the various flanges are pressed on at the same time.

Figs. 9 and 10 show the wheel housing 7 with die 20 and plunger 21, and this part is comparatively easily made.

In Figs. 11 to 14 the division possible for the roof is shown. In this case a division is provided in the middle of the reinforcing rib 19a in case the large press which is necessary is not available. These parts are assembled by means of steel screws or ordinary screw bolts. The window frame 12 in Fig. 13 is in this case made somewhat steeper with respect to the remaining wall surface than in the construction according to Fig. 3. It approximates more to the ordinary window frame construction. This is made possible for the small dimensions of the rear part of the roof and the altered withdrawal direction of the plunger.

Figs. 15 and 16 illustrate the die 20 and plunger 21 for the side parts 4. These parts are of comparatively simple construction but they are of large area. A compensation for the high pressure necessary is provided by the opening for the window 5 so that here also the frame parts can be pressed simultaneously.

Figs. 17 and 18 show the side parts 2 and Figs. 19 and 20 show the end wall parts 15 with the corresponding die 20 and plunger 21.

This last-named comparatively simple part, which is not visible in the completed vehicle, may, like the floor 1, be constructed not in artificial resin material, but in sheet metal which is connected with the parts of artificial material by attached angle pieces or by direct screwing together of the flanges.

Especially in the case of a self-supporting vehicle body, it is also desirable to take into consideration the arrangement of the division in such a manner that the course of the lines of strength is in no way interfered with. In order to obtain an ideal result in such a vehicle body, it is necessary to combine all the possibilities of divison in such a manner that all the above-mentioned conditions are met.

What I claim is:

A vehicle body comprising, a plurality of individual parts formed of pressed laminated artificial resin materials, said parts being shaped during the pressing and curing of the resin to provide an outer shell of the vehicle body when assembled with the edges thereof adjacent each other, the adjoining edges of said parts having integral flanges arranged therealong extending inwardly of the vehicle body and formed during the pressing and curing of the resin, integral ledges along the edges of the parts and projecting outwardly of the shell and said parts being so shaped that the adjoining edges extend in such directions that said ledges provide rain shields and supplement the reinforcement provided by the flanges.

CONRAD SCHULZ.